(12) United States Patent
Lee et al.

(10) Patent No.: US 7,868,282 B2
(45) Date of Patent: Jan. 11, 2011

(54) AUTOMATIC VISION DISPLAY APPARATUS

(75) Inventors: Sung-Ha Lee, Chungju-si (KR);
Sung-Chul Kang, Seongnam-si (KR);
Sang-Chul Ahn, Seoul (KR);
Bong-Seok Kim, Seoul (KR);
Seung-Yong Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 506 days.

(21) Appl. No.: 11/718,152

(22) PCT Filed: Oct. 5, 2005

(86) PCT No.: PCT/KR2005/003287

§ 371 (c)(1),
(2), (4) Date: Jun. 23, 2008

(87) PCT Pub. No.: WO2006/080688

PCT Pub. Date: Aug. 3, 2006

(65) Prior Publication Data

US 2009/0079942 A1    Mar. 26, 2009

(30) Foreign Application Priority Data

Oct. 30, 2004   (KR) .................... 10-2004-0087619

(51) Int. Cl.
*H01L 27/00* (2006.01)
(52) U.S. Cl. .................................. 250/208.1; 250/221
(58) Field of Classification Search .............. 250/208.1, 250/221, 214 R, 559.3; 353/69–72, 119; 345/8, 9
See application file for complete search history.

(56) References Cited

U.S. PATENT DOCUMENTS 1,948,295 A * 2/1934 Haines et al. ............... 40/212

(Continued)

FOREIGN PATENT DOCUMENTS

WO   WO 2005/076250 A1   8/2005

OTHER PUBLICATIONS

Ramos, J. J. G., et al., "A Software Environment for an Autonomous Unmanned Airship," Proceedings of the 1999 IEEE/ASME Intl. Conference on Advanced Intelligent Mechatronics, pp. 1008-1013, Sep. 19-23, 1999.

(Continued)

*Primary Examiner*—Que T Le
(74) *Attorney, Agent, or Firm*—Fenwick & West LLP

(57) ABSTRACT

An automatic vision display apparatus has a flight object having a floating gas filled therein to fly, flying along a vertical wall surface and including a screen mounted at an opposite side to the vertical wall surface; a propulsion unit mounted at a predetermined position of the flight object and moving the flight object; a control unit mounted to the flight object and controlling the propulsion unit; a projector projecting an image on the screen of the flight object at a distance from the flight object; an adjusting unit adjusting an image projecting direction of the projector; and a main control unit controlling the projector to project the image and controlling the adjusting unit so that the projector tracks a movement of the flight object to project an image. According to the invention, it is possible to project an image while automatically tracking the screen of the flight object being flying. In addition, it is possible to correct a distortion of the projected when the screen of the flight object consists of the three dimensional curved surface.

14 Claims, 8 Drawing Sheets

U.S. PATENT DOCUMENTS 5,114,224 A 5/1992 Miyamoto et al.

OTHER PUBLICATIONS

Zhang, H., "Flying A Blimp—A Case Study of Project-Based Hands-on Engineering Education," Proceedings of the 2002 American Society for Engineering Education Annual Conference & Exposition, Session 1306, 2002, 8 pages.

International Search Report and Written Opinion of the International Searching Authority, PCT/KR2005/003287, Jan. 10, 2006, 7 pages.

* cited by examiner

[Fig. 1]
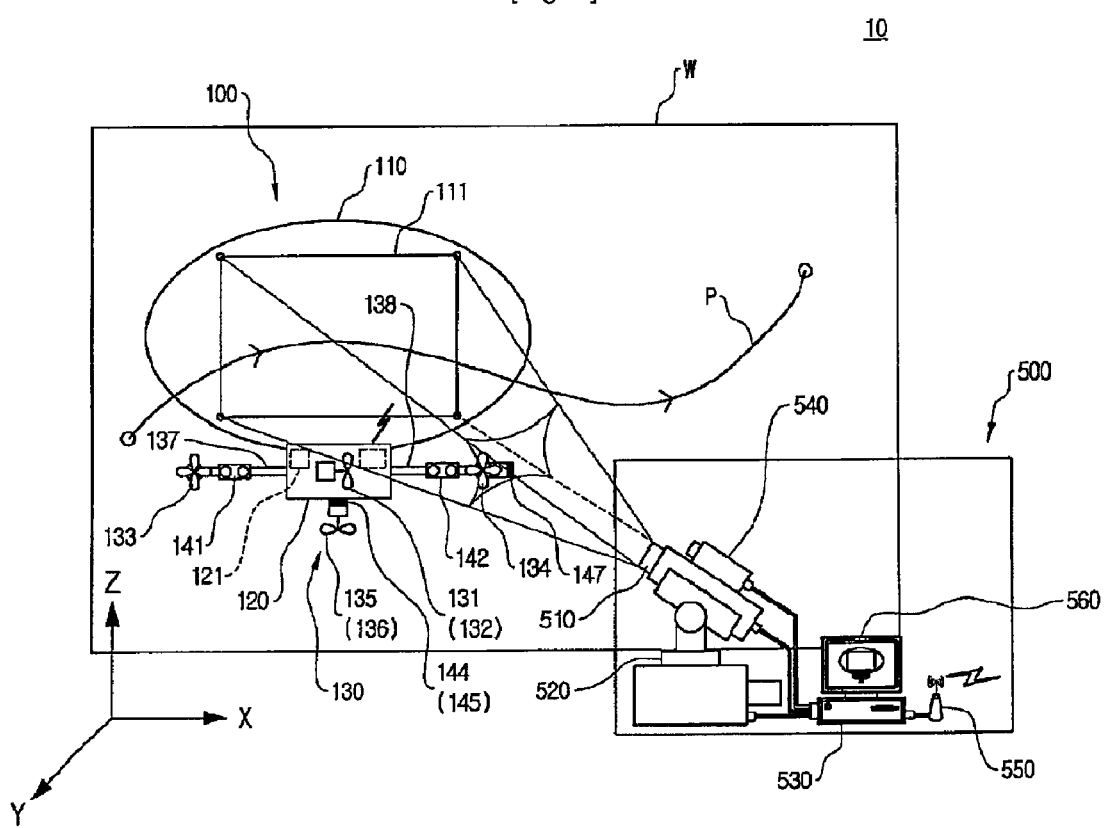

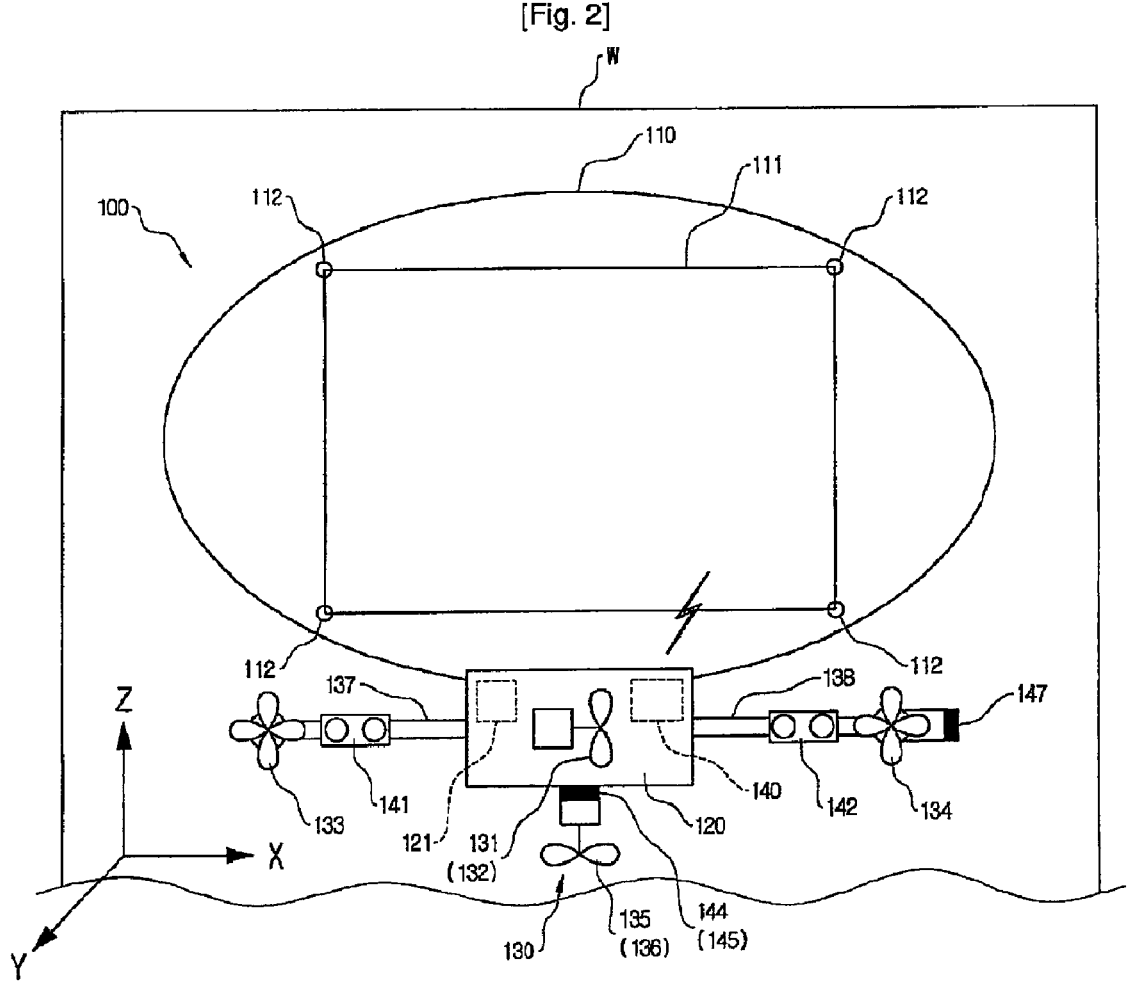
[Fig. 2]

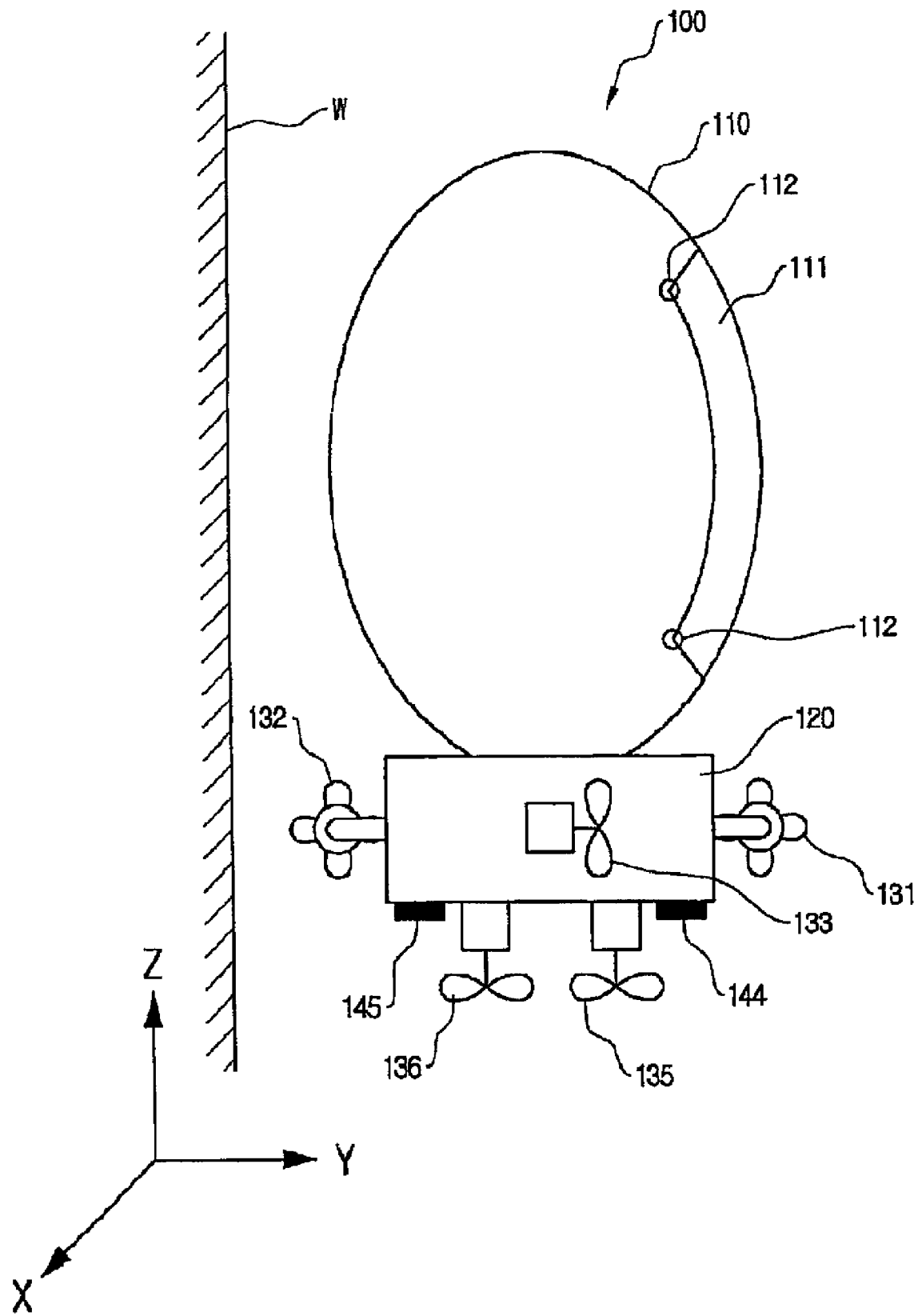
[Fig. 3]

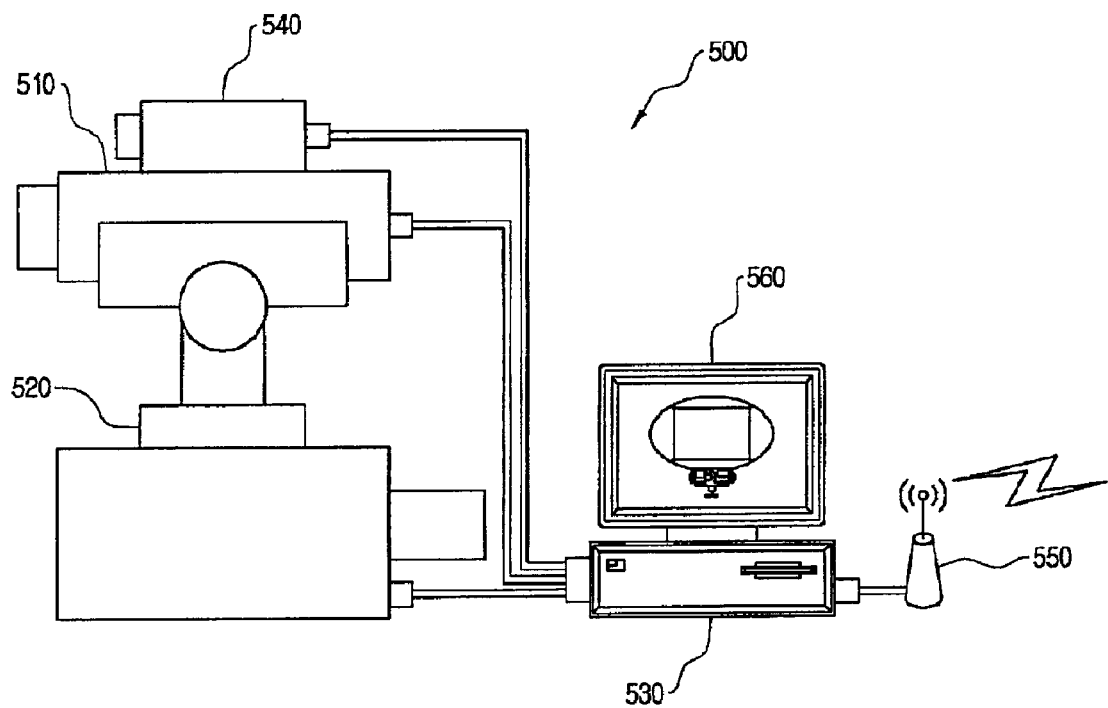
[Fig. 4]

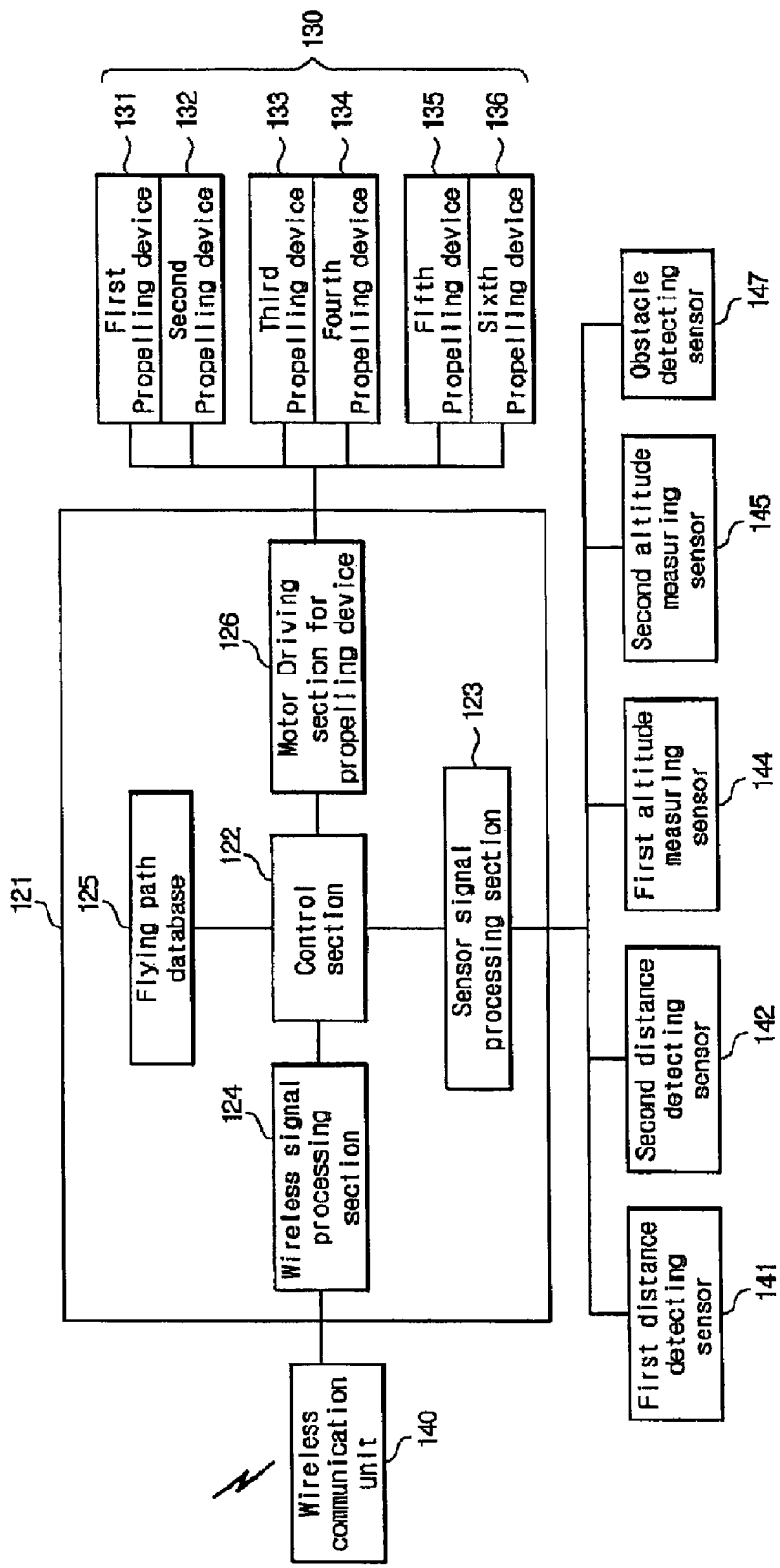
[Fig. 5]

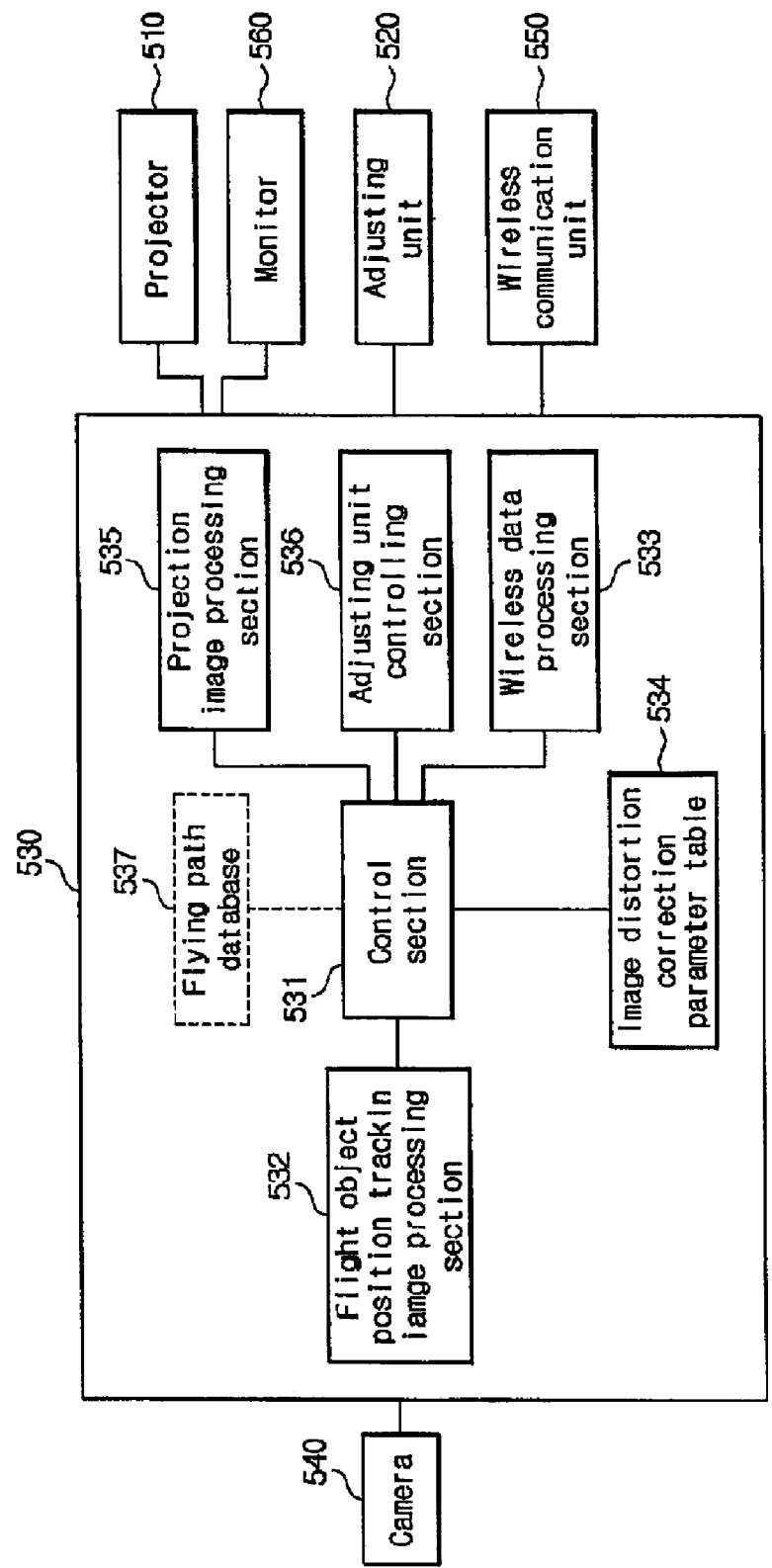
[Fig. 6]

[Fig. 7]
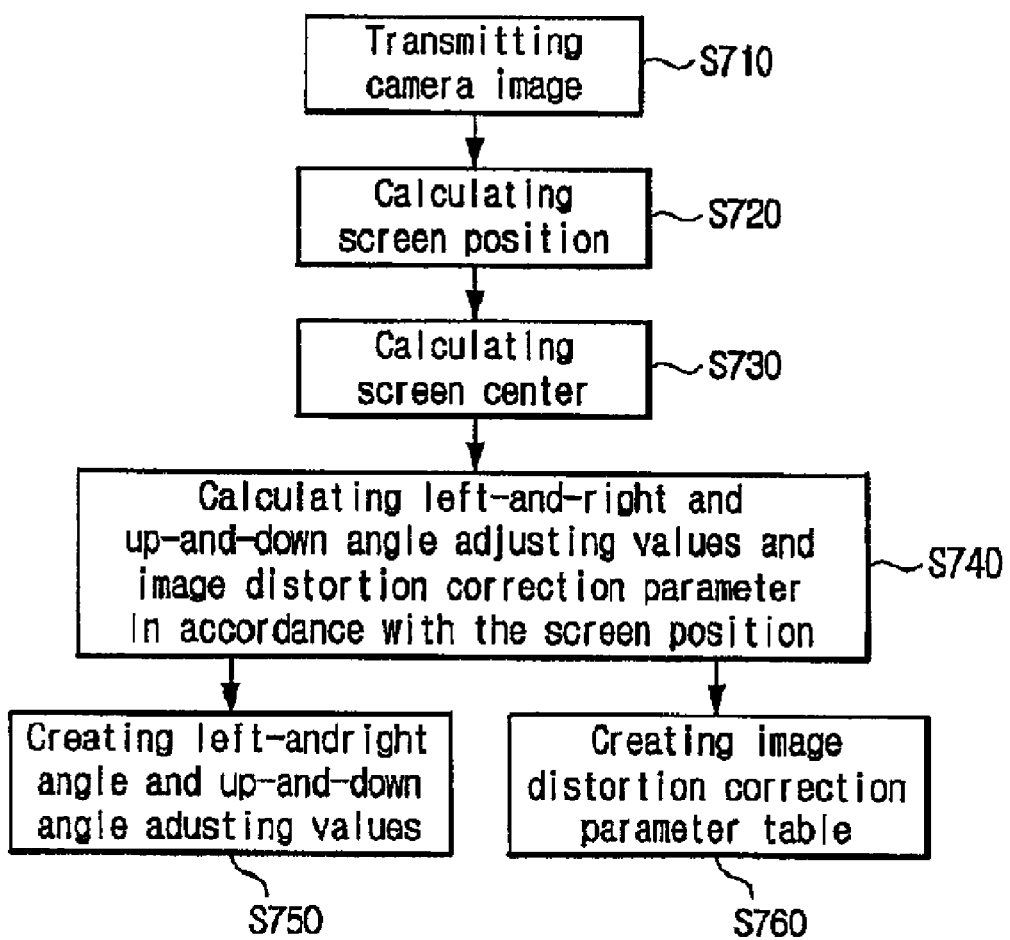

[Fig. 8]
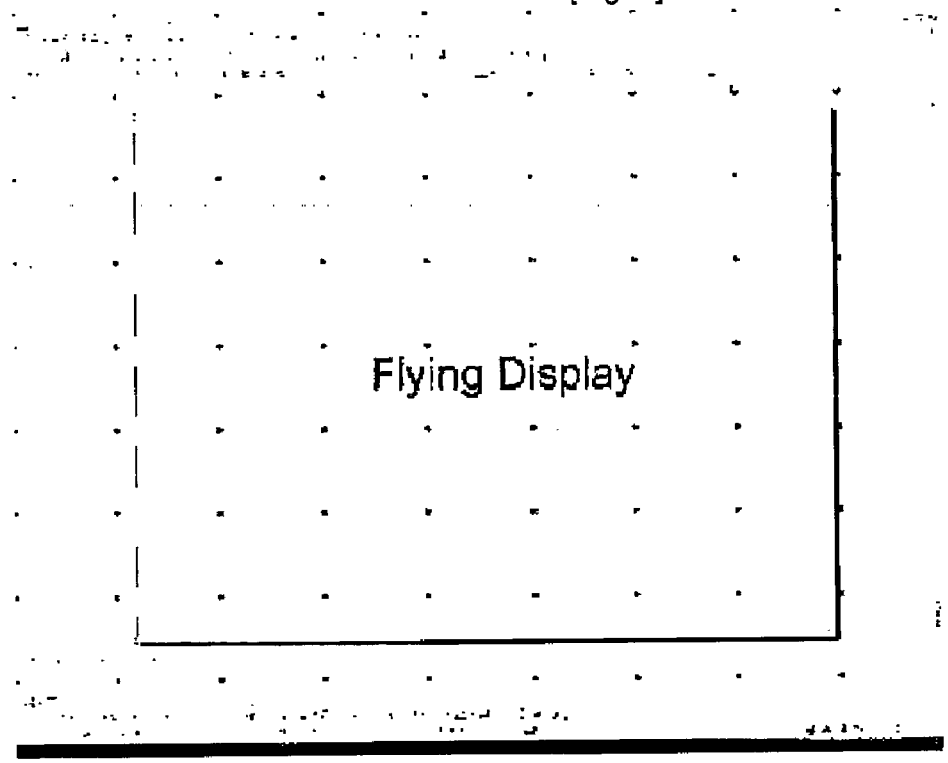
[Fig. 9]
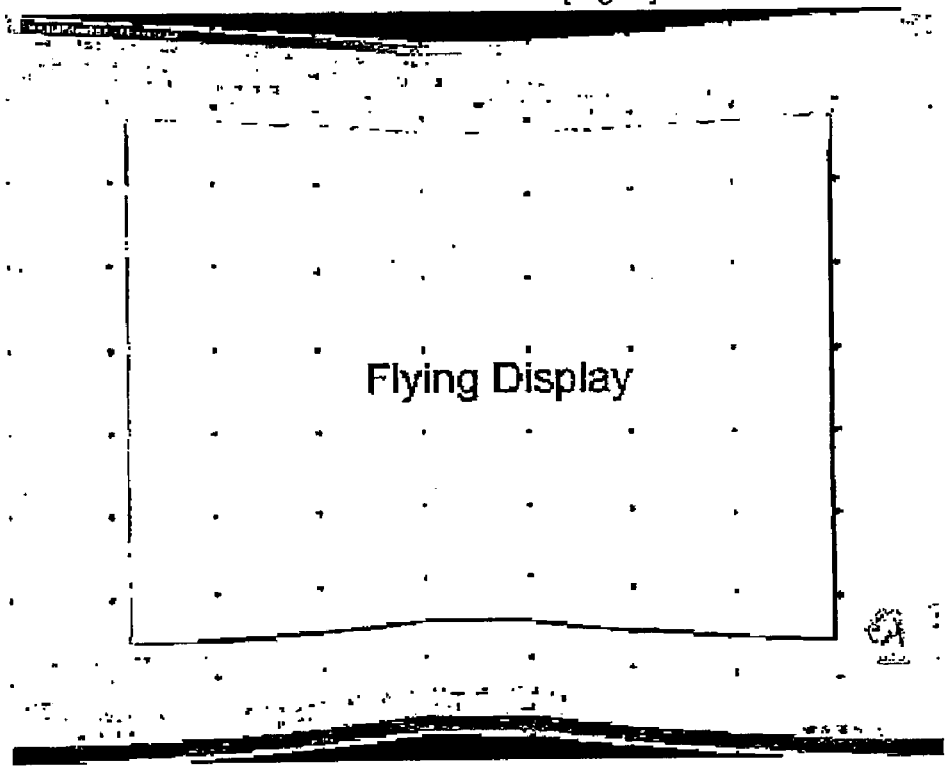

AUTOMATIC VISION DISPLAY APPARATUS

BACKGROUND OF THE INVENTION

1. Field of the Invention

The present invention relates to an automatic vision display apparatus using pursuit of flying path of flying screen unit, and more particularly to an automatic vision display apparatus capable of pursuit of a flying screen unit being flying to project a image thereof and to correct a distortion of the displayed image.

2. Description of the Related Art

In recent years, a image projection apparatus has been equipped at a place in which many people gather, which apparatus projects an image such as advertisement or publicity to focus the people's eyes on it, thereby increasing the advertising effect. In the image projection apparatus, a screen is generally fixed and an advertising image is projected on the fixed screen using the image projection apparatus.

According to the fixed type projection apparatus, since the screen is fixed, it is possible to stably project the image. However, since it is impossible to move the screen at a place in which many people gather, the advertising or publicity effect is decreased.

Accordingly, in order to solve the problem of the fixed type projection apparatus, it is developed an apparatus which projects an image on a screen mounted on a moving vehicle such as automobile.

However, the vehicle type projection apparatus has a problem that an image is not properly projected due to a shaking of the vehicle when there are severe irregularities on the ground. In addition, in case that an obstacle exists between the vehicle moving along the ground and the projection apparatus, an image is not properly projected on the screen and the image is not properly seen even at a small distance because the vehicle is moving along the ground.

Accordingly, there is a need of a novel vision display apparatus having the moving ability of the vehicle type projection apparatus, not being affected by the ground condition and capable of solving the image screening problem.

A called 'floating device (blimp or airship)' having a floating gas filled therein may make up for the disadvantages of the fixed type or vehicle type apparatus. When an image is projected on a surface of the floating device, there is no worry about the limitation in the movement or the disturbance of the obstacle, which are problems of the fixed type screen or vehicle type apparatus, because the floating device is in air.

However, it is difficult for the floating device to maintain a stationary state for a long time or to move along a preset course. In addition, it is difficult to project an image to the floating device being moving.

SUMMARY OF THE INVENTION

Accordingly, the present invention has been made to solve the above problems. An object of the invention is to provide an automatic vision display apparatus comprising a flying screen unit which automatically flies along a preset flying path or manually flies by a person's manipulation.

Another object of the invention is to provide an automatic vision display apparatus capable of automatically tracking a flying screen unit being flying to project an image, and to correct a distortion phenomenon of the projected image.

Technical Solution

In order to achieve the above object, there is provided an automatic image projection apparatus comprising a flight object having a floating gas filled therein to fly, flying along a vertical wall surface and including a screen mounted at an opposite side to the vertical wall surface; a propulsion unit mounted at a predetermined position of the flight object and moving the flight object; a control unit mounted to the flight object and controlling the propulsion unit; a projector projecting an image on the screen of the flight object at a distance from the flight object; an adjusting unit adjusting an image projecting direction of the projector; and a main control unit controlling the projector to project the image and controlling the adjusting unit so that the projector tracks a movement of the flight object to project an image. The propulsion unit may comprise first and second propelling devices linearly moving the flight object along a X-axis direction, third and fourth propelling devices linearly moving the flight object along a Y-axis direction or rotating it around a Z-axis, and fifth and sixth propelling devices linearly moving the flight object along the Z-axis direction or rotating it around a X-axis.

In the mean time, according to an embodiment of the invention, the automatic image projection apparatus may further comprise a handling unit manipulating the control unit in a wireless manner, so that a user manipulates the handling unit to manipulate the control unit of the flight object so as to allow the flight object to be manually manipulated to fly, or so that the control unit controls the propulsion unit so as to allow the flight object to automatically fly along a preset flying path.

In addition, according to an embodiment of the invention, the automatic image projection apparatus may further comprise a camera photographing the flight object and transmitting image information thereof to the main control unit. The main control unit calculates real time coordinates of the screen of the flight object based on the image information transmitted from the camera to control the adjusting unit so that the projector tracks the screen of the flight object to project an image, and transmits the real time coordinates of the screen of the flight object to the control unit. The control unit compares the real time coordinates transmitted from the main control unit with the preset flying path to control the propulsion unit so that the flight object can fly along the preset flying path.

In the mean time, the flight object of the automatic image projection apparatus may comprise first and second distance detecting sensors, and first and second altitude measuring sensors and the control unit controls the propulsion unit depending on sensing results of the sensors, so that the flight object can fly to be parallel with the vertical wall surface while maintaining a distance from the vertical wall surface and to be also parallel with a ground while maintaining a predetermined altitude or more. In addition, the flight object may further comprise an obstacle detecting sensor, so that it can fly while avoiding an obstacle present in a flight course.

Additionally, the automatic image projection apparatus of the invention may further comprise a camera photographing the flight object and transmitting image information thereof to the main control unit and the main control unit calculates real time coordinates of the flight object based on the image information transmitted from the camera to correct a distortion of the image projected on the screen of the flight object depending on relative positions of the screen of the flight object and the projector.

BRIEF DESCRIPTION OF THE DRAWINGS

The above and other objects, features and advantages of the present invention will be more apparent from the following detailed description taken in conjunction with the accompanying drawings, in which:

FIG. 1 is a view schematically showing an overall structure of an automatic vision display apparatus using pursuit of a flying path of a flying screen unit according to an embodiment of the invention;

FIG. 2 is a front view of a flying screen unit according to an embodiment of the invention;

FIG. 3 is a side view of FIG. 2;

FIG. 4 is a view schematically showing a structure of an image projection unit according to an embodiment of the invention;

FIG. 5 is a block diagram showing a controlling process of a control unit in a flying screen unit according to an embodiment of the invention;

FIG. 6 is a block diagram showing a controlling process of a main control unit in an image projection unit according to an embodiment of the invention;

FIG. 7 is a flow chart showing a controlling process of an adjusting unit and image distortion correcting process according to an embodiment of the invention;

FIG. 8 is a view showing an image before correcting it on a computer screen; and FIG. 9 is a view showing an image after correcting it on a computer screen.

DETAILED DESCRIPTION OF EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

FIG. 1 is a view schematically showing a structure of an automatic vision display apparatus 10 according to an embodiment of the invention.

Referring to FIG. 1, the automatic vision display apparatus 10 comprises a flying screen unit 100 flying along a vertical wall surface W and an image projection unit 500 tracking the flying screen unit 100 to project an image thereof.

The flying screen unit 100 comprises a flight object 110 being filled with a floating gas therein to fly and flies along the vertical wall surface W and having a screen 111 mounted to a side thereof, a propulsion unit 130 mounted at a predetermined position of the flight object 110 and moving the flight object 110, and a control unit 121 controlling the propulsion unit 130.

In addition, the image projection unit 500 comprises a projector 510 projecting an image on the screen 111 of the flight object 110 at a distance from the flight object 110, an adjusting unit 520 adjusting an image projecting direction of the projector 510, and a main control unit 530 controlling the adjusting unit 520 so that the projector 510 tracks a movement of the flight object 110 and also controlling the projector 510 to project an image.

First, constitution of the flying screen unit 100 and the image projection unit 500 will be described and then an image distortion correction of the automatic vision display apparatus 10 will be explained.

FIG. 2 is a front view of the flying screen unit 100 according to an embodiment of the invention and FIG. 3 is a left side view of FIG. 2.

Referring to FIGS. 2 and 3, the flight object 110 is made of a thin and light material so that it can easily fly. In addition, the material has a flexible property that it is expanded when a floating gas is injected into the flight object 110. In FIGS., it is shown that the flight object 110 has an elliptical structure of a volume. However, it should be noted that the flight object 110 is not limited thereto and can have a variety of shapes. A helium gas is proper for the gas injected into the flight object 110, which is widely used as gas for a floating device.

The flight object 110 flies at a distance from the vertical wall surface W. The screen 111 is mounted to a side of the flight object 110 opposite to the vertical wall surface W. An image projected from the image projection unit 500 (refer to FIG. 1) is reproduced due to the screen 111. In the mean time, since the flight object 110 has a certain volume as shown in FIG. 3, the screen 111 mounted to a surface of the flight object 110 has a three dimensional curved shape. Accordingly, if an image is projected by the image projection unit 500 without any correction, the image to be reproduced by the screen 111 is distorted. Accordingly, an image is corrected by the main control unit 530 (refer to FIG. 1) so that the image projected by the image projection unit 500 can be normally seen, which will be specifically described.

A lower part of the flight object 110 is provided with a control box 120. The control box 120 is preferably mounted to a lower part of the gravity center of the flight object 110, thereby preventing the flight object 10 from being inclined when it flies. The control box 120 is mounted with the propulsion unit 130 flying the flight object 110 at the external thereof and provided with the control unit 121 controlling the propulsion unit 130 and a wireless communication unit 140 exchanging data with the main control unit 530 of the image projection unit 500 therein. Although it is not shown in FIGS., a power source supplying power to the control unit 121 and the propulsion unit 130, such as battery may be positioned in the control box 120.

As shown in FIGS. 2 and 3, the propulsion unit 130 comprises first and second propelling devices 131, 132 provided to sides of the control box 120 and linearly moving the flight object 110 along a X-axis direction, third and fourth propelling devices 133, 134 linearly moving the flight object 110 along a Y-axis direction or rotating it around a Z-axis, and fifth and sixth propelling devices 135, 136 mounted at a lower part of the control box 120 and linearly moving the flight object 110 along the Z-axis direction or rotating it around the X-axis. According to this embodiment, propellers to be driven by an electric motor are adopted as the propelling devices 131, 132, 133, 134, 135, 136. However, the invention is not limited thereto and a variety of modifications can be properly made by those skilled in the art.

Hereinafter, flight movements of the flight object 110 by the propulsion unit 130 will be described.

In this embodiment, the first and second propelling devices 131, 132 mounted at opposite sides of the control box 120 rotate in a same direction and linearly move the flight object 110 along the X-axis. The flight object 110 is linearly moved along the X-axis depending on the rotation directions of the first and second propelling devices 131, 132.

In the mean time, the third and fourth propelling devices 133, 134 mounted at the other opposite sides of the control box 120 can rotate in a same direction or counter direction. When the third and fourth propelling devices 133, 134 rotate in a same direction each other, the flight object 110 is linearly moved along the Y-axis depending on the rotation directions. To the contrary, when third and fourth propelling devices 133, 134 rotate in the counter direction each other, the flight object 110 is rotated around the Z-axis. When the flight object 110 flies with being inclined to the vertical wall surface W, the control unit 121 controls the third and fourth propelling devices 133, 134 so that the flight object 110 rotates around the Z-axis by a predetermined angle to be parallel with the vertical wall surface W.

In the mean time, the third and fourth propelling devices 133, 134 of the propulsion unit 130 are rotatably connected to elongated rotation shafts 137, 138 extending from the control box 120, respectively, as shown in FIG. 2. Like this, in case that the third and fourth propelling devices 133, 134 are connected to the elongated rotation shafts 137, 138 and rotate in the counter direction, a moment applied to the flight object 110 can be obtained by a following equation 1.

$$M = FR \quad \text{[equation 1]}$$

where M is an amount of the moment, F is a force applied by a propelling device and R is a distance from the gravity center axis of the flight object 110 to the propelling devices 133, 134. When the forces applied by the propelling devices 133, 134 are same, as the distance R from the gravity center axis of the flight object 110 to the propelling devices 133, 134 is increased, the moment M rotating the flight object 110 is increased.

As shown in FIG. 2, when the third and fourth propelling devices 133, 134 are connected to the elongated rotation shafts 137, 138 extending from the control box 120 and driven, it is possible to apply a higher moment to the flight object 110. Accordingly, it is possible to rotate the flight object 110 more easily when the flight object 110 is rotated around the Z-axis. Correspondingly to this, a reaction speed becomes also rapid.

In the mean time, as shown in FIG. 3, the fifth and sixth propelling devices 135, 136 are arranged in a row along the Y-axis at a distance at a lower part of the control box 120. The fifth and sixth propelling devices 135, 136 can rotate in a same direction or counter direction, as the third and fourth propelling devices 133, 134. When the fifth and sixth propelling devices 135, 136 rotate in a same direction each other, the flight object 110 ascends and descends along the Z-axis depending on the rotation directions. On the contrary, when the fifth and sixth propelling devices 135, 136 rotate in the counter direction, the flight object 110 rotates around the X-axis. When the flight object 110 flies with being inclined to the ground (not shown), the control unit 121 (refer to FIG. 2) controls the fifth and sixth propelling devices 135, 136 so that the flight object 110 is rotated around the X-axis to be parallel with the ground.

The propulsion unit 130 is controlled by the control unit 121, as described above. The control unit 121 is provided in the control box 120 mounted at the lower part of the flight object 110. The control unit 121 controls the propulsion unit 130 so that the flight object 110 flies along a preset flying path P. The flying path P may be previously stored in the control unit 121 of the flight object 110 or previously inputted to the main control unit 530 (refer to FIG. 1) of the image projection unit 500 (refer to FIG. 1) and then transmitted to the control unit 121 from the main control unit 530.

In the mean time, as shown in FIGS. 2 and 3, the flight object 110 further comprises two distance detecting sensors 141, 142 and altitude measuring sensors 144,145 and a single obstacle detecting sensor 147.

The first and second distance detecting sensors 141, 142 are mounted at a same plane to be respectively adjacent to ends of the rotation shafts 137, 138 to which the third and fourth propelling devices 133, 134 are connected. The first and second distance detecting sensors 141, 142 measure a distance between the flight object 110 and the vertical wall surface W, and transmit the measurement result to the control unit 121. The control unit 121 controls the propulsion unit 130 so that the measurement result of the distance transmitted from the first and second distance detecting sensors 141, 142 is approximate to a preset value. Accordingly, the control unit 121 prevents the flight object 110 from being collided with the vertical wall surface W.

In addition, in case that the distances measured by the first and second distance detecting sensors 141, 142 are different from each other and thus the flight object 110 flies with being inclined to the vertical wall surface W, the control unit 121 controls the third and fourth propelling devices 133, 134 of the propulsion unit 130 to rotate the flight object 110 around the Z-axis, thereby allowing the flight object 110 to fly with being parallel with the vertical wall surface W, as described above.

In the mean time, the obstacle detecting sensor 147 is mounted at an end of the rotation shaft 138 of the fourth propelling device 134. The obstacle detecting sensor 147 detects an obstacle present along the flying path P (refer to FIG. 1) of the flight object 110 and transmits the detection result to the control unit 121. When there is an obstacle in the flying path P, the control unit 121 controls the propulsion unit 130 so that the flight object 110 avoids the obstacle and flies along the preset flying path P. Although it is shown that the single obstacle detecting sensor 147 is mounted, the invention is not limited thereto and more than one sensor may be mounted to perform a more precise sensing.

Referring to FIG. 3, two altitude measuring sensors 144, 145 are mounted to a lower part of the control box 120. As shown in FIG. 3, the altitude measuring sensors 144, 145 are arranged in a row along the Y-axis. The altitude measuring sensors 144, 145 measure an altitude of the flight object 110 and transmit the measurement result to the control unit 121. The control unit 121 controls the fifth and sixth propelling devices 135, 136 of the propulsion unit 130 so that the altitude of the flight object 110 is not lowered to a height less than the preset altitude. In addition, when the altitudes measured by each of the altitude measuring sensors 144, 145 are different from each other and thus the flight object 110 flies with being inclined to the ground (not shown), the control unit 121 controls the fifth and sixth propelling devices 135, 136 of the propulsion unit 130 to rotate the flight object 110 around the X-axis and thus to allow the flight object 110 to fly with being parallel to the ground, as described above.

A variety of the distance detecting sensors 141, 142, the altitude measuring sensors 144, 145 and the obstacle detecting sensor 147 have been already known. According to an embodiment of the invention, an ultrasonic sensor is preferably used.

FIG. 4 is a view schematically showing a structure of the image projection unit 500 according to an embodiment of the invention.

Referring to FIG. 4, the image projection unit 500 comprises a projector 510 projecting an image on the screen 111 (refer to FIG. 1) of the flight object 110 (refer to FIG. 1), an adjusting unit 520 adjusting an image projecting direction of the projector 510, and a main control unit 530 controlling the projector 510 to project an image and also controlling the adjusting unit 520 so that the projector 510 tracks a movement of the flight object 110 to project an image.

The projector 510 projects an image on the screen 111 of the flight object 110 in accordance with the control of the main control unit 530. A variety of image projecting projectors 510 have been already known and thus a detailed description thereof is omitted.

A lower part of the projector 510 is provided with the adjusting unit 520 which adjusts an image projection direction of the projector 510. The adjusting unit 520 adjusts a left-and-right angle or up-and-down angle of the projector 510 based on the control of the main control unit 530.

In the mean time, the image projection unit 500 may further comprise a camera 540 photographing the flight object 110 and transmitting image information of the flight object 110 to the main control unit 530. The camera 540 is mounted to the adjusting unit 520 or preferably to an upper part of the projector 510 to move together with the projector 510, as shown in FIG. 4.

The main control unit 530 uses the image information about the flight object 110 transmitted from the camera 540 to calculate real time coordinates of the flight object 110, more specifically the screen 111 mounted to the flight object 110 through an image processing algorithm previously inputted. The main control unit 530 controls the left-and-right angle and up-and-down angle adjusting values of the adjusting unit 520 based on the calculated real time coordinates of the screen 111 so that the projector 510 tracks the screen 111 of the flight object 110 to project an image.

In addition, the information about the real time coordinates of the screen 111 of the flight object 110 calculated in the main control unit 530 is used to control the flight movement of the flight object 110 in a feedback manner. In other words, the control unit 121 (refer to FIG. 1) of the flying screen unit 100 (refer to FIG. 1) receives the real time coordinates for the present position of the screen 111 of the flight object 110 from the main control unit 530. The control unit 121 compares the received real time coordinates with the preset flying path P (refer to FIG. 1) to control the propulsion unit 130 (refer to FIG. 1), thereby allowing the flying screen unit 100 to correctly move along the preset flying path P.

For the above-described feedback control, the image projection unit 500 may further comprise a wireless communication unit 550. The main control unit 530 wirelessly transmits the real time coordinates of the screen 111 to the control unit 121 of the flying screen unit 100 through the wireless communication unit 550 (refer to FIG. 1, 140).

In the mean time, in order to find the real time coordinates of the screen 111 of the flight object 110 more precisely, a marking part 112 having a specific shape can be indicated on the screen 111 of the flight object 110. The marking part 112 may be indicated at four corners of the screen 111 using a color or fluorescent paint which is definitely distinguished from the surroundings.

Referring to FIG. 4 again, the camera 510 detects the marking parts 112 (refer to FIG. 2) indicated at the four corners of the screen 111 (refer to FIG. 2) and then transmits the image information to the main control unit 530. The main control unit 530 calculates the position of the screen 111, preferably the real time coordinates of the center of the screen 111 using the image information and thus controls the adjusting unit 520 so that the projector 510 projects an image to the center of the screen 111. Meanwhile, according to another embodiment of the invention, an infrared camera (not shown) is additionally provided with the image projection unit 500 and the marking part 112 may be indicated not to be distinguished with naked eyes but distinguished by the infrared camera only. In this embodiment, since the marking part is not distinguished with naked eyes, it is possible to prevent one's eyes from being scattered due to the marking part.

A reference numeral 560 in FIG. 4 refers to a monitor. The monitor 560 is connected to the main control unit 530, so that an operator can check the image projected on the screen 111 of the flight object 110, the real time information of the flight object 110 and the like through the monitor 560.

FIG. 5 is a block diagram showing a controlling process of the control unit 121 of the flying screen unit 100 (refer to FIG. 1) according to an embodiment of the invention.

Referring to FIG. 5, the control unit 121 may comprise a control section 122, a sensor signal processing section 123, a wireless signal processing section 124, a flying path database 125 and a motor driving section 126 for the propelling device.

The information inputted from the first and second distance detecting sensors 141, 142, the first and second altitude measuring sensors 144, 145 and the obstacle detecting sensor 147 is converted into a distance from the vertical wall surface W, an altitude from the ground, a position of the obstacle and the like through the sensor signal processing section 123 and then applied to the control section 122. In addition, the information about the real time coordinates of the screen 111 of the flight object 110, which is transmitted from the main control unit 530 (refer to FIG. 4), is received via the wireless communication unit 140 and then applied to the control section 122 from the wireless signal processing section 124.

The control section 122 compares the distance from the vertical wall surface W and the altitude from the ground inputted with the preset values to control the propulsion unit 130 through the motor driving section 126 so that the flight object 110 flies to be parallel with the vertical wall surface W while maintaining the distance and to be parallel with the ground without being lowered to a height less than the preset altitude. In addition, the control section 122 controls the propulsion unit 130 through the motor driving section 126 so that the flight object 110 flies along the preset flying path P (refer to FIG. 1) while avoiding the obstacle with the information about the position of the obstacle. Accordingly, the flying screen unit 100 flies to be parallel with the vertical wall surface W and the ground along the flying path P of a defined X-Z axes direction while maintaining the distance from the vertical wall surface W and avoiding the obstacle, without being lowered to a height less than the preset altitude.

The information about the flying path P may be previously inputted to the flying path database 125 of the control unit 121 of the flying screen unit 100, as shown in FIG. 5. Accordingly, the control section 122 can obtain and use the information about the flying path P from the flying path database 125.

In another preferred embodiment of the invention, the information about the flying path P may be inputted to the main control unit 530 of the image projection unit 500, rather than the control unit 121 of the flying screen unit 100. In this case, the control section 122 receives and uses the information about the flying path P from the main control unit 530 via the wireless communication unit 140 (refer to FIG. 4, 550).

FIG. 6 is a block diagram showing a controlling process of the main control unit 530 of the image projection unit 500 (refer to FIG. 1) according to an embodiment of the invention.

Referring to FIG. 6, the main control unit 530 comprises a control section 531, a flight object position-tracking image processing section 532, a wireless data processing section 533, an image distortion correction parameter table 534, a projection image processing section 535 and an adjusting unit controlling section 536. Meanwhile, according to another embodiment of the invention, the main control unit 530 may further comprises a flying path database 537 having information about the flying path P (refer to FIG. 1).

The control section 531 first controls the projection image processing section 535 to project an image to the screen 111 (refer to FIG. 1) through the projector 510. In addition, the control section 531 displays the image projected to the screen 111 of the flight object 110 (refer to FIG. 1), the information about the real time coordinates of the flight object 110 and the like with the monitor 560 through the projection image processing section 535.

The flight object position-tracking image processing section 532 of the main control unit 530 calculates the central position of the screen 111 into the real time coordinates through the image of the flying screen unit 100 (refer to FIG. 2) captured by the camera 540, preferably the marking parts 112 (refer to FIG. 2) indicated at the four corners of the screen 11 (refer to FIG. 2) and then transmits the real time coordinates to the control section 531. The control section 531 calculates the left-and-right and up-and-down angle adjusting values for controlling a direction of the projector 510, based on the real time information about the center of the screen 111, and then applies them to the adjusting unit controlling section 536. The adjusting unit controlling section 536 controls the adjusting unit 520 with the left-and-right and up-and-down angle adjusting values to allow the projector 510 to project an image while tracking the screen 111 of the flight object 110.

In the mean time, the control section 531 applies the real time coordinate value of the screen 111 of the flight object 110 to the wireless data processing section 533 to transmit it to the control unit 121 of the flying screen unit 100 through the wireless communication unit 550 (refer to FIG. 2, 140). The control unit 121 of the flying screen unit 100 controls the flight object 110 to fly along the preset flying path P using the transmitted real time coordinates of the screen 111.

In the mean time, referring to FIG. 3 again, since the flight object 110 has a certain volume, the screen 111 provided on the surface of the flight object 110 has a three dimensional curved surface. Accordingly, the image projected from the projector 510 is seen to be distorted on the screen 111 having the three dimensional curved surface, rather than being seen to be normal. According to the present invention, the control section 531 of the image projection unit 500 corrects the image distortion phenomenon, thereby showing a normal image to the seeing people, as a flat surface screen.

The image distortion correction is performed in accordance with a relative position of the screen 111 of the flight object 10 and the projector 510. This is specifically described with reference to FIG. 6.

An operator calculates a parameter for an image distortion correction in accordance with a relative position of the screen 111 (refer to FIG. 1) of the flight object 110 (refer to FIG. 1) and the projector 510 in advance, and then stores in the main control unit 530 in a form of a table, i.e., the image distortion correction parameter table 534. The correction parameter will be more specifically described later. The control section 531 obtains the image distortion correction parameter from the table 534 in accordance with a relative position of the screen 111 and the projector 510 calculated through the camera 540, thereby correcting the image.

In the mean time, in another preferred embodiment of the invention, the image distortion correction parameter table 534 is not inputted to the main control unit 530 in advance. Instead, the control section 531 may create and use a parameter table corresponding to the current coordinates of the screen 111 in accordance with a relative position of the screen 111 and the projector 510 through image information of the screen 111 inputted from the camera 540. In this case, since the position of the screen 111 of the flight object 110 can be obtained from the image information transmitted from the camera 540 and the direction of the projector 510 is controlled by using it, the parameters for the image distortion correction are determined in accordance with the position of the screen 111 of the flight object 110.

FIG. 7 is a flow chart showing a process of obtaining the left-and-right angle and up-and-down angle adjusting values of the adjusting unit 520 and the distortion correction parameters from the image of the camera 540 by the control section 531 of the main control unit 530.

Referring to FIG. 7, the control section 531 receives an image of the screen 111 of the flight object 110 from the camera 540 (S710). The control section 531 calculates a real time position of the screen 111 through the transmitted image information of the screen 111 (S720) and then real time coordinates of the center of the screen 111 (S730). After calculating the real time coordinates of the center of the screen 111, the control section 531 calculates the left-and-right angle and up-and-down angle adjusting values of the adjusting unit 520 and the image distortion correction parameters in accordance with the calculated real time coordinates of the center of the screen 111 (S740). Through the process, the left-and-right angle and up-and-down angle adjusting values of the adjusting unit 520 are created (S750) and the correction parameter table for correcting the distorted image is created (S760).

FIG. 8 is a view showing an image before the image is corrected on a computer screen, and FIG. 9 is a view showing an image after the image is corrected on a computer screen. In FIGS. 8 and 9, spots indicate vertexes of lattices on the computer screen.

Referring to FIGS. 8 and 9, the image distortion correction is performed by dividing the projected image into lattices having a predetermined size, and moving vertexes of the lattices into a predetermined direction by a certain amount in accordance with the image distortion parameters. In other words, the image distortion parameter include information about to what extent the vertexes of the lattices should be moved to what direction.

As shown in FIG. 9, when the vertexes of the lattices are moved to the certain direction by a predetermined amount through the correction, the image, which is seen to be normal, is seen to be distorted. Accordingly, if the image is corrected through such manner, it is possible to make the image, which is projected on the screen 111 provided along the three-dimensional curved surface, be normal without being distorted.

In the mean time, although it has been described that the flying screen unit 100 flies automatically, the invention is not limited thereto and the flying screen unit 100 can be manually manipulated. In other words, it may be further provided a handling unit (not shown) operating the control unit 121 of the flying screen unit 100 in a wireless manner so that a user can operate the handling unit to manually handle the flight of the flying screen unit 100. The method that the image projection unit 500 tracks the flying screen unit 100, which is manually operated, projects an image thereof and corrects a distorted image is same as described above. Accordingly, a detailed description thereof is omitted.

As described above, according to the invention, it is possible to maximize advertising and publicity effects at a place in which many people gather, such as exhibition hall, department and indoor amusement park, with the flying screen unit moving along a preset path and the image projection unit tracking the flying screen unit to project the image. In other words, since the automatic vision display apparatus of the invention can move in air irrespective of the obstacle on the ground, it can be used at the public place in which many people gather.

In addition, in case that the flying screen unit of the invention flies automatically, since it flies along the preset flying path by the control unit, it is possible to reduce a labor of handing the flying screen unit.

Additionally, the flying screen unit of the invention comprises the distance detecting sensors and the altitude measuring sensors, so that it can fly to be parallel with the vertical wall surface W and the ground along the defined flying path of X and Y-axes while maintaining the distance from the vertical wall surface W and avoiding the obstacle, without being lowered to a height less than the preset altitude.

Further, the flying screen unit of the invention further comprises the obstacle detecting sensor, so that it can fly along the flying path while avoiding the obstacle when there is the obstacle in the preset flying path.

In the mean time, since the automatic image projection apparatus of the invention can project the image having corrected the distortion with the main control unit on the screen of the flight object, it is possible to reproduce the normal image having no distortion on the screen even though the screen of the flight object consists of the three-dimensional curved surface.

While the invention has been shown and described with reference to certain preferred embodiments thereof, it will be understood by those skilled in the art that various changes in form and details may be made thereto without departing from the spirit and scope of the invention as defined by the appended claims.

The invention claimed is:

1. An automatic vision display apparatus comprising:
a flight object having a floating gas filled for flying along a vertical wall surface and including a screen mounted at an opposite side to the vertical wall surface;
a propulsion unit mounted at a predetermined position relative to the flight object for moving the flight object;
a control unit mounted to the flight object for controlling the propulsion unit;
a projector projecting an image on the screen of the flight object at a distance from the flight object;
an adjusting unit adjusting an image projecting direction of the projector; and
a main control unit controlling the projector to project the image and controlling the adjusting unit so that the projector tracks a movement of the flight object to project an image.

2. The apparatus according to claim 1, wherein the propulsion unit is mounted to a lower part of the flight object and comprises first and second propelling devices linearly moving the flight object along a X-axis direction, third and fourth propelling devices linearly moving the flight object along a Y-axis direction or rotating it around a Z-axis, and fifth and sixth propelling devices linearly moving the flight object along the Z-axis direction or rotating it around the X-axis.

3. The apparatus according to claim 2, further comprising a handling unit manipulating the control unit in a wireless manner, wherein a user manipulates the handling unit to manipulate the control unit of the flight object so that the flight object is manually manipulated to fly.

4. The apparatus according to claim 3, further comprising a camera photographing the flight object and transmitting image information thereof to the main control unit, wherein the main control unit calculates real time coordinates of the screen of the flight object based on the image information transmitted from the camera to control the adjusting unit so that the projector tracks the screen of the flight object to project an image.

5. The apparatus according to claim 2, wherein the control unit controls the propulsion unit so that the flight object flies along a preset flying path, thereby allowing the flight object to automatically fly.

6. The apparatus according to claim 5, further comprising a camera photographing the flight object and transmitting image information thereof to the main control unit,
wherein the main control unit calculates real time coordinates of the screen of the flight object based on the image information transmitted from the camera to control the adjusting unit so that the projector tracks the screen of the flight object to project an image and to transmit the calculated real time coordinates of the screen of the flight object to the control unit;
wherein the control unit compares the calculated real time coordinates transmitted from the main control unit with a preset flying path to control the propulsion unit so that the flight object flies along the preset flying path.

7. The apparatus according to claim 6, wherein flying path information is inputted to the control unit of the flight object in advance or the flying path information is inputted to the main control unit in advance, so that the flying path information is transmitted to the control unit by the main control unit.

8. The apparatus according to claim 5, further comprising a distance detecting sensor unit provided to a predetermined position of the flight object for measuring a distance between the flight object and the vertical wall surface and transmitting a measurement result thereof to the control unit, wherein the control unit controls the propulsion unit so that the distance measurement result transmitted from the distance detecting sensor unit is approximate to a preset value.

9. The apparatus according to claim 8, wherein the distance detecting sensor unit comprises first and second distance detecting sensors mounted at a same plane of the flight object at an interval, and wherein the control unit controls the propulsion unit so that each of the distance measurement results transmitted from the first and second distance detecting sensors is approximate to a preset value, thereby allowing the flight object to fly in parallel with the vertical wall surface while maintaining a distance from the vertical wall surface.

10. The apparatus according to claim 9, further comprising at least one obstacle detecting sensor provided to a predetermined position of the flight object and detecting an obstacle present in the flying path of the flight object, wherein the control unit controls the propulsion unit so that the flight object flies along a preset flying path while avoiding the obstacle in accordance with the detection result of the obstacle detecting sensor.

11. The apparatus according to claim 10, further comprising first and second altitude measuring sensors mounted to a lower part of the flight object at an interval in a same plane,
wherein the control unit controls the propulsion unit so that each of the measurement results transmitted from the first and second altitude measuring sensors is approximate to each other, thereby allowing the flight object to fly in parallel with the ground.

12. The apparatus according to claim 1, further comprising a camera photographing the flight object and transmitting image information thereof to the main control unit,
wherein the main control unit calculates real time coordinates of the flight object based on the image information transmitted from the camera to correct a distortion of the image projected to the screen of the flight object in accordance with a relative position of the screen of the flight object and the projector.

13. The apparatus according to claim 12, wherein the main control unit stores an image distortion correction parameter table previously calculated in accordance with the relative position of the screen of the flight object and the projector, wherein the main control unit obtains an image distortion correction parameter corresponding to the relative position of the screen of the flight object and the projector in accordance with the image information transmitted from the camera from the image distortion correction parameter table, thereby correcting an image projected to the screen of the flight object.

14. The apparatus according to claim 12, wherein the main control unit calculates an image distortion correction parameter corresponding to the relative position of the screen of the flight object and the projector in accordance with the image information transmitted from the camera, thereby correcting an image projected to the screen of the flight object.

* * * * *